United States Patent
Ruetten et al.

(10) Patent No.: US 6,760,405 B2
(45) Date of Patent: Jul. 6, 2004

(54) EXPOSURE CONTROL IN AN X-RAY IMAGE DETECTOR

(75) Inventors: Walter Ruetten, Linnich/Ederen (DE); Michael Overdick, Langerwehe (DE); Falko Busse, Aachen (DE); Anthony Roy Franklin, East Grinstead (GB); Martin John Powell, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 30 days.

(21) Appl. No.: 10/130,640

(22) PCT Filed: Sep. 20, 2001

(86) PCT No.: PCT/EP01/10860

§ 371 (c)(1),
(2), (4) Date: May 20, 2002

(87) PCT Pub. No.: WO02/25314

PCT Pub. Date: Mar. 28, 2002

(65) Prior Publication Data

US 2002/0181648 A1 Dec. 5, 2002

(30) Foreign Application Priority Data

Sep. 20, 2000 (EP) .............................. 00308217

(51) Int. Cl.[7] .............................................. H05G 1/64
(52) U.S. Cl. .................... 378/98.8; 378/97; 250/370.09
(58) Field of Search ............................... 378/98.7, 98.8, 378/108, 97, 19; 250/370.08, 370.07, 370.09

(56) References Cited

U.S. PATENT DOCUMENTS

| | | | |
|---|---|---|---|
| 5,461,658 A | 10/1995 | Joosten | |
| 5,937,027 A | * 8/1999 | Thevenin et al. | 378/98.8 |
| 6,185,274 B1 | * 2/2001 | Kinno et al. | 378/98.8 |
| 6,307,915 B1 | * 10/2001 | Frojdh | 378/98.8 |
| 6,404,851 B1 | * 6/2002 | Possin et al. | 378/98.7 |

FOREIGN PATENT DOCUMENTS

| | | |
|---|---|---|
| EP | 1 001 665 A2 | 5/2000 |
| FR | 2 771 513 | 5/1999 |

OTHER PUBLICATIONS

International Search Report PCT/EP 01/10860.

* cited by examiner

Primary Examiner—Craig E. Church
Assistant Examiner—Irakli Kiknadze

(57) ABSTRACT

An x-ray detector apparatus comprises an array of detector pixels (20), each pixel (20) comprising a conversion element (26, 260) for converting incident radiation into a charge flow, a charge storage element (28) and a switching device (29) enabling the charge stored to be provided to an output of the pixel (20). A plurality of dose sensing pixels further comprise a dose sensing element (40, 50) during x-ray exposure results in a change in the charge stored on the charge storage element (28) and also results in a dose sensing signal being generated which can be read out from the pixel (20). The dose sensing pixels enable a dose signal to be obtained without reading the charges stored on the pixel charge storage elements, so that dose sensing can be carried out during exposure.

15 Claims, 8 Drawing Sheets

EXPOSURE CONTROL IN AN X-RAY IMAGE DETECTOR

The invention relates to an X-ray detector and to an X-ray examination apparatus, which uses the detector. The detector is for providing image signals as well as exposure control signals. In particular, the invention relates to an X-ray examination apparatus in which exposure measurement circuitry is integrated with solid state X-ray detector circuitry, which enables real time control of the X-ray exposure during an image acquisition process.

It is well known that the X-ray exposure of a patient should be controlled as a function of the absorptivity of the tissue under examination. For example, overexposed areas of high brightness may occur in the image, for example caused by X-rays which are not (or only hardly) attenuated by the object to be examined, for example a patient. Tissue having a low X-ray absorptivity, for example lung tissue, will provide less attenuation and therefore requires less X-ray exposure to obtain an image of given contrast and to prevent saturation of the image detector.

Configurations of known X-ray examination apparatus are well known to those skilled in the art. Typically, the apparatus includes an X-ray source for irradiating a patient to be radiologically examined, by means of an X-ray beam. Due to local differences in the X-ray absorptivity within the patient, an X-ray image is formed. The X-ray detector derives an image signal from the X-ray image. In a detector using an optical sensor, the detector has a conversion layer or surface for converting the incident X-ray energy into optical signals. In the past, these optical signals have largely been detected by an image intensifier pick-up chain, which includes an X-ray image intensifier and a television camera.

A known X-ray examination apparatus of this type is disclosed in U.S. Pat. No. 5,461,658. This document additionally discloses an exposure control system in which an auxiliary light detection system utilizes local brightness values in the optical image in order to adjust the X-ray source. This auxiliary light detection system includes a CCD sensor for locally measuring the brightness in the optical image. The exposure control system derives a control signal from the measured brightness values, the control signal being used to adjust the X-ray apparatus in such a manner that an X-ray image of high diagnostic quality is formed and displayed, namely such that small details are included in the X-ray image and suitably visibly reproduced. The control signal controls the intensity and/or the energy of the X-ray beam and can also be used to control the amplification of the image signal. Both steps influence the signal level of the image signal directly or indirectly.

More recently, the use of a solid state X-ray detectors have been proposed. There are two basic configurations for such devices.

In a so-called "indirect" detector arrangement, the incident X-ray radiation is first converted into light. An array of photosensitive cells is provided, each comprising a light-sensitive element (photodiode), and a charge storage device (which may be a separate element or it may be the self-capacitance of the photodiode).

In a so-called "direct" detector arrangement, an X-ray sensitive photoconductor is used to convert the X-rays directly into electrons. Since the photoconductor has no self-capacitance, a capacitor is fabricated by thin film techniques to act as a charge storage device.

During X-ray exposure, the light incident on each cell is stored as a level of charge on the charge storage device, to be read out at the end of the exposure period. The read out of charges stored effectively resets the image sensor, so this can only be carried out at the end of the X-ray exposure period. Thus, it is not possible to use the output signals from an image sensor of this type to control the exposure period in real time, because such outputs are only available at the end of exposure. The nature of the solid state image sensor device also prevents the type of feedback control described above using CCDs to be implemented.

One possible way to achieve dose control is to analyse the obtained image, and then to repeat the image acquisition process with a different exposure level. Of course, this increases the overall exposure of the patient to potentially harmful X-ray radiation, and is also not appropriate for rapidly changing images, or where images from different viewpoints are required in rapid succession.

External dose sensing arrangements have been proposed which are independent of the solid state image detector, but these can degrade the image quality. There is therefore a need for a dose sensing arrangement which enables real time dose control and which can be used with solid state image sensors.

According to the invention, there is provided an X-ray detector apparatus comprising an array of detector pixels, each pixel comprising a conversion element for converting incident radiation into a charge flow, a charge storage element and a switching device enabling the charge stored to be provided to an output of the pixel, and wherein a plurality of dose sensing pixels further comprise a dose sensing element, wherein charge flow from the conversion element during X-ray exposure results in a change in the charge stored on the charge storage element and also results in a dose sensing signal being generated which can be read out from the pixel.

This detector is preferably used in an X-ray examination apparatus comprising an X-ray source for exposing an object to be examined to X-ray energy. The detector receives an X-ray image after attenuation by the object to be examined.

The apparatus may further comprise a phosphor conversion layer for converting an incident X-ray signal into an optical signal, and the conversion element then comprises an optical sensor, such as a photodiode. The charge storage element may then be a separate element in parallel with the photodiode, or it may comprise the self-capacitance of the photodiode.

Alternatively, the conversion element may comprise a photoconductor, which converts the X-ray radiation directly into an electron charge flow.

The dose sensing pixels enable a dose signal to be obtained without reading the charges stored on the pixel charge storage elements, so that dose sensing can be carried out during exposure.

The pixels may be arranged in rows and columns, with rows of pixels sharing a row address line and columns of pixels sharing a column readout line, wherein the charge storage element is connected in series with the switching device between a common electrode for all pixels and the column readout line, the switching device being controlled by the row address line.

This is a known pixel configuration. In use, charge storage elements are all initially pre-charged. During exposure, the conversion element is isolated (because the switching device is turned off) and charge flow results in partial discharge of the charge storage element. The level of discharge is measured at the end of the cycle (by measuring the flow of charge required to recharge the capacitor) and represents the level of illumination. This known pixel configuration can be adapted in various ways to provide dose sensing pixels of the invention.

Defining a node between the charge storage element and the switching device, the dose sensing element of the dose sensing pixels may comprise a further charge storage element connected between the node and a dose signal readout line. As charges are supplied to this charge storage element, the charge flow can be measured by a charge sensitive amplifier at the end of the dose signal readout line. However, the charge stored can still be read out at the end of the exposure time, so that no image signal is lost.

Alternatively, the dose sensing element of the dose sensing pixels may comprise a transistor connected between a dose electrode common for all the dose sensing pixels and a dose signal readout line, the gate of the transistor being connected to the node. In this arrangement, the voltage on the charge storage capacitor is supplied as a gate voltage. The source-drain current can then be sampled to obtain this gate voltage, which is a measure of the state of charge of the charge storage element, and therefore represents the preceding level of incident X-ray radiation. Again, the measurement of the dose sensing signal does not destroy the image sensor signal on the charge storage element.

Preferably, the dose sensing signals for a plurality of dose sensing pixels are supplied to an individual dose signal readout line. For example, the dose signal readout lines may be parallel to the column readout lines and arranged alternately with the column readout lines.

The dose sensing pixels associated with an individual dose signal readout line may be arranged in a block, and wherein pixel dose outputs in the block are connected together in columns with column lines, and a single row connection line is provided for connecting together the pixel dose outputs of different columns in the block. This single row connection line enables the number of points at which dose signal lines cross to be minimised, which reduces cross talk.

The dose signal readout lines may alternatively be parallel to the row address lines and are then arranged alternately with the row address lines.

Preferably, all pixels are dose sensing pixels. This enables all pixels to have the same layout, which reduces image artifacts.

The invention also provides a method of using the X-ray examination apparatus of the invention, the method comprising:

exposing the object to be examined with X-ray radiation;

monitoring output signals from selected dose sensing pixels during the exposure;

halting the X-ray exposure in response to the dose sensing signal monitoring; and reading out the charges stored on the charge storage elements to obtain an X-ray image.

Examples of the invention will now be described in detail with reference to the accompanying drawings, in which.

Figure 1:
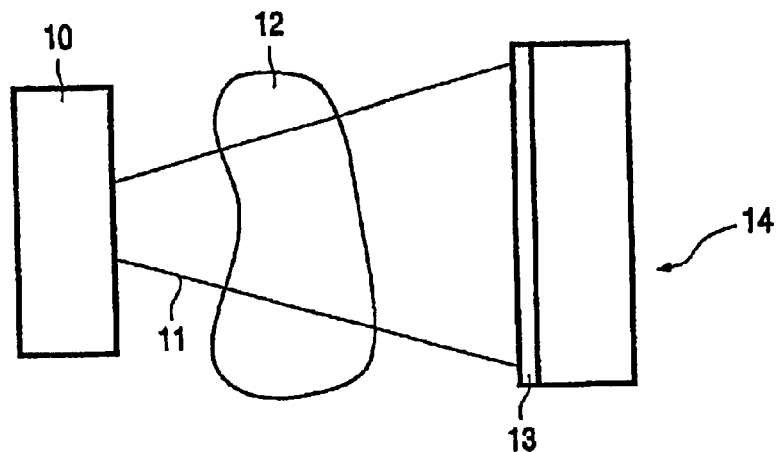
FIG. 1 shows a known X-ray examination apparatus.

FIG. 1 shows a known X-ray examination apparatus which includes an X-ray source 10 for irradiating an object 12 to be examined, for example a patient to be radiologically examined, by means of an X-ray beam 11. Due to local differences in the X-ray absorption within the patient, an X-ray image is formed on an X-ray-sensitive surface 13 of the X-ray detector 14.

One known design of X-ray detector 14 uses a solid state optical image sensor. The incident X-ray radiation is converted into light using a phosphor scintillator 13. This light can be detected by the solid-state device 14. Alternatively, an X-ray sensitive photoconductor can be used to convert the X-rays directly into electrons.

FIG. 2 shows one known design for the solid state optical image sensor. The sensor comprises an array of pixels 20 arranged in rows and columns. Rows of pixels share a row address line 22, and columns of pixels share a readout line 24. Each pixel comprises a photodiode 26 in parallel with a charge storage capacitor 28. This capacitor 28 may be a separate component, or else it may simply comprise the self-capacitance of the photodiode 26. This parallel combination is connected in series with a thin film transistor 29 between a common electrode 30 and the column readout line 24 for that particular pixel. The pixel array is provided on a glass substrate 32. Row driver circuitry 34 provides signals for the row address lines 22, and the column readout lines 24 provide an output from the substrate 32, and each column readout line 24 is associated with a respective charge sensitive amplifier 36.

The function of the photodiode is to convert the incident radiation into a flow of charge which alters the level of charge stored on the capacitor. In the case of direct conversion of the radiation using a photoconductor, the capacitor 28 is implemented as a separate thin film component, and again the level of charge stored is a function of the flow of charge from the photoconductor. FIG. 2B shows a known design of solid state direct X-ray detector. The same references are used as in FIG. 2A for the same components. The photoconductor 260 is biased to a suitable operating voltage and effectively replaces the photodiode 26 in the arrangement of FIG. 2A.

In operation of the image sensor device, the capacitors 28 are all charged to an initial value. This is achieved by the previous image acquisition or else may be achieved with an initial reset pulse on all row conductors 22. The charge sensitive amplifiers are reset using reset switches 38.

During X-ray exposure, light incident on the photodiodes 26 causes charge to flow in the reverse-bias direction through the photodiodes. This current is sourced by the capacitors 28 and results in a drop in the voltage level on those capacitors. Alternatively, the charge flow through the photoconductor 260 drains the charge from the capacitors 28.

At the end of X-ray exposure, row pulses are applied to each row conductor 22 in turn in order to switch on the transistors 29 of the pixels in that row. The capacitors 28 are then recharged to the initial voltage by currents flowing along between the common electrode 30 and the column readout lines 24 and through the transistor switches. In the example shown, these currents will be sourced by the charge sensitive amplifiers 36, rather than flow to them. The amount of charge required to recharge the capacitors 28 to the original level is an indication of the amount of discharge of the storage capacitor 28, which in turn is an indication of the exposure of the pixel to incident radiation. This flow of charge is measured by the charge sensitive amplifiers. This procedure is repeated for each row to enable a full image to be recovered.

A problem with the use of solid-state image sensors of this type is that a pixel signal is only obtained during the read out stage, after the exposure has been completed. As will be apparent from the above description, any read out of signals results in recharging of the pixel capacitors 28, and effectively resets those pixels. Therefore, it is not possible to take samples during the image acquisition process, and the image sensor design does not therefore allow real-time exposure measurements to be obtained.

In accordance with the invention, dose sensing pixels are provided which include a dose sensing element, which provides a dose sensing signal which can be read out from the pixel without resetting the charge stored on the pixel capacitor 28.

In the following description, optical detector pixels are shown with modification to provide the dose sensing function of the invention. However, the invention applies equally to direct detection schemes such as shown in FIG. 2B.

Figure 2A:
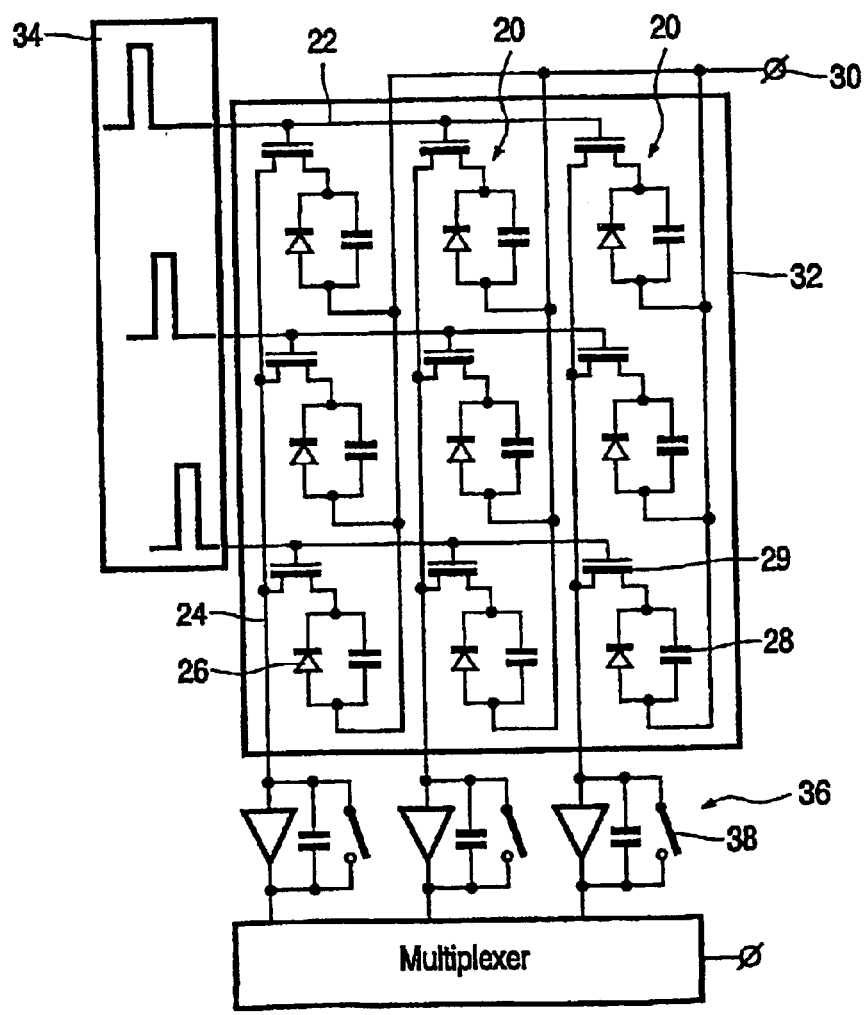
FIG. 2A shows a first known pixel layout for a solid state image sensor used in the apparatus of FIG. 1.
Figure 2B:
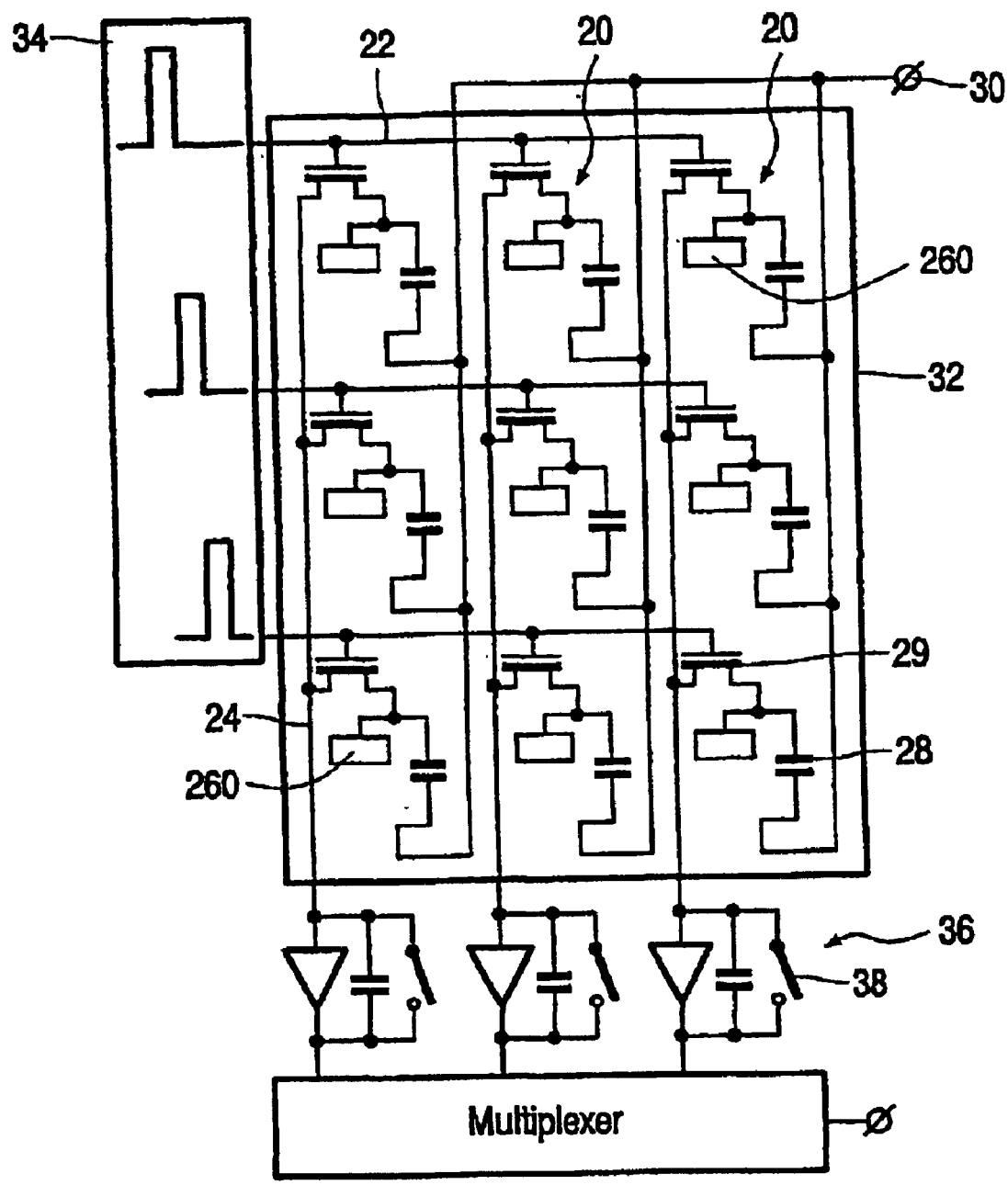
FIG. 2B shows a second known pixel layout for a solid state image sensor used in the apparatus of FIG. 1.
Figure 3:
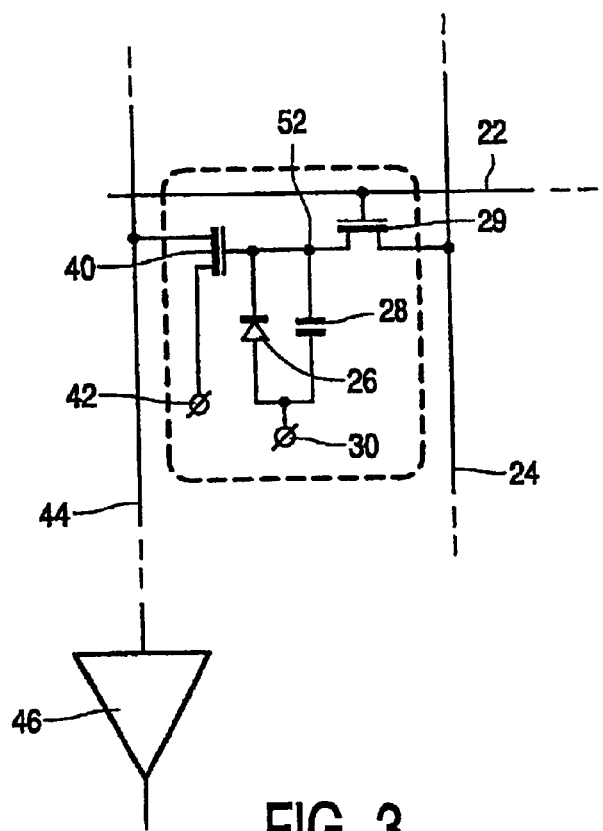
FIG. 3 shows a first modified pixel arrangement according to the invention.

FIG. 3 shows a first modification to the basic pixel layout of FIG. 2A to provide a dose sensing pixel of the invention. Throughout the Figures, the same reference numbers will be used for the same components, and description of those components will not be repeated.

In addition to the components already described with reference to FIG. 2A, the pixel further comprises a transistor 40 connected between a common electrode 42 (common for all dose sensing pixels) and a dose signal readout line 44. The gate of the transistor 40 is supplied with the voltage on the pixel capacitor 28.

As will be explained in further detail below, a number of dose sensing pixels share the dose signal readout line 44.

The operation of this pixel configuration will now be described. In conventional manner, the voltage on the pixel capacitor 28 is preset to a known level before the image acquisition process. Consequently, the gate of the dose sensing transistor 40 is also at this known potential. The common electrode 42 is at a potential which allows a quiescent current to flow from a dose sensing current amplifier 46 through the transistor 40 and to the common electrode 42, with the gate of the transistor 40 being at this initial gate potential.

During X-ray exposure, the voltage on the pixel capacitor 28 changes, which changes the gate-source voltage of the transistor 40. The source of transistor 40 is connected to the common electrode 42. A change in current through the transistor 40 results, which is detected by the dose sensing current amplifier 46.

The connection of a number of pixels to a shared dose signal readout line 44 results in the summation of the drain currents from these transistors. This summed drain current is then sensed by the current amplifier 46.

Preferably, the amplifiers 46 provide only a small drain-source voltage to the dose sensing transistors 40. This allows the transistors 40 to operate in the linear region, where the drain current depends linearly on the gate-source voltage. Due to the linear dependency of this voltage on the accumulated charge on the pixel capacitance, and hence on the dose incident on the pixel cell, there is also a linear dependency of the drain current on the incident dose. A resistor can be added between the source of transistor 40 and the common electrode 42, essentially forming a voltage-controlled current source. In this case, the drain-source voltage does not need to be small compared to the gate-source voltage.

Figure 4:
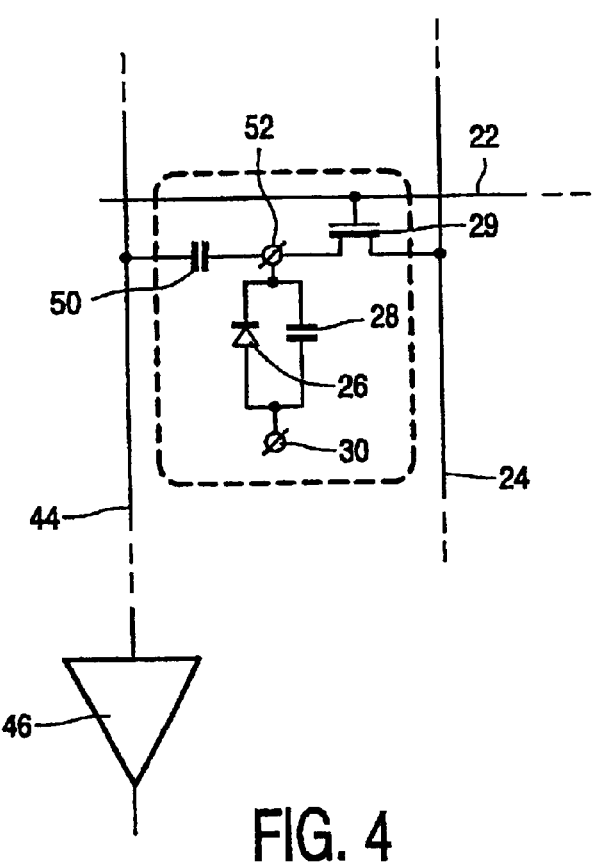
FIG. 4 shows a second modified pixel arrangement according to the invention.

FIG. 4 shows a second modification of the pixel layout of FIG. 2A to provide the dose sensing capability. In this pixel configuration, a further capacitor 50 is provided between the dose signal readout line 44 and the junction 52 between the switching transistor 29 and the parallel photodiode/capacitor arrangement 26, 28.

As described above, during X-ray exposure, the photodiode 26 provides a flow of charge which is proportional to the dose incident on the pixel. Part of this charge is stored on the pixel capacitor 28, while the other part flows on to the dose sensing capacitor 50. This causes a corresponding flow of charge along the dose signal readout line 44. The dose sensing charge sensitive amplifier 46 measures this flow of charge. As for the arrangement in FIG. 3, a number of pixels are associated with an individual dose signal readout line 44. The charge sensitive amplifier 46 maintains a fixed potential at its input, so that cross talk from one pixel cell to another does not arise.

At the end of the X-ray exposure, the pixels are read out in conventional way by switching on the pixel transistors 29 to allow a charge to flow along the column readout line 24 which recharges the pixel capacitor 28. However, charge also flows to the dose sensing capacitor 50, so that charges flowing to or from the dose sensing capacitor 50 during X-ray exposure are not lost, but are recovered when the image read out process takes place.

The dose sensing capacitor 50 is preferably smaller than the pixel capacitor 29. This leaves most of the area occupied by the pixel cell for the photodiode 26, ensuring a high efficiency of the pixel cell. Furthermore, this results in the total pixel capacitance being increased only slightly, with only a small consequent increase in switching noise during pixel read out.

An associated current amplifier 46 may be provided for each dose sensing signal, or else a multiplexing switch arrangement may be used for selectively switching dose sensing signals to a shared current amplifier 46.

Figure 5:
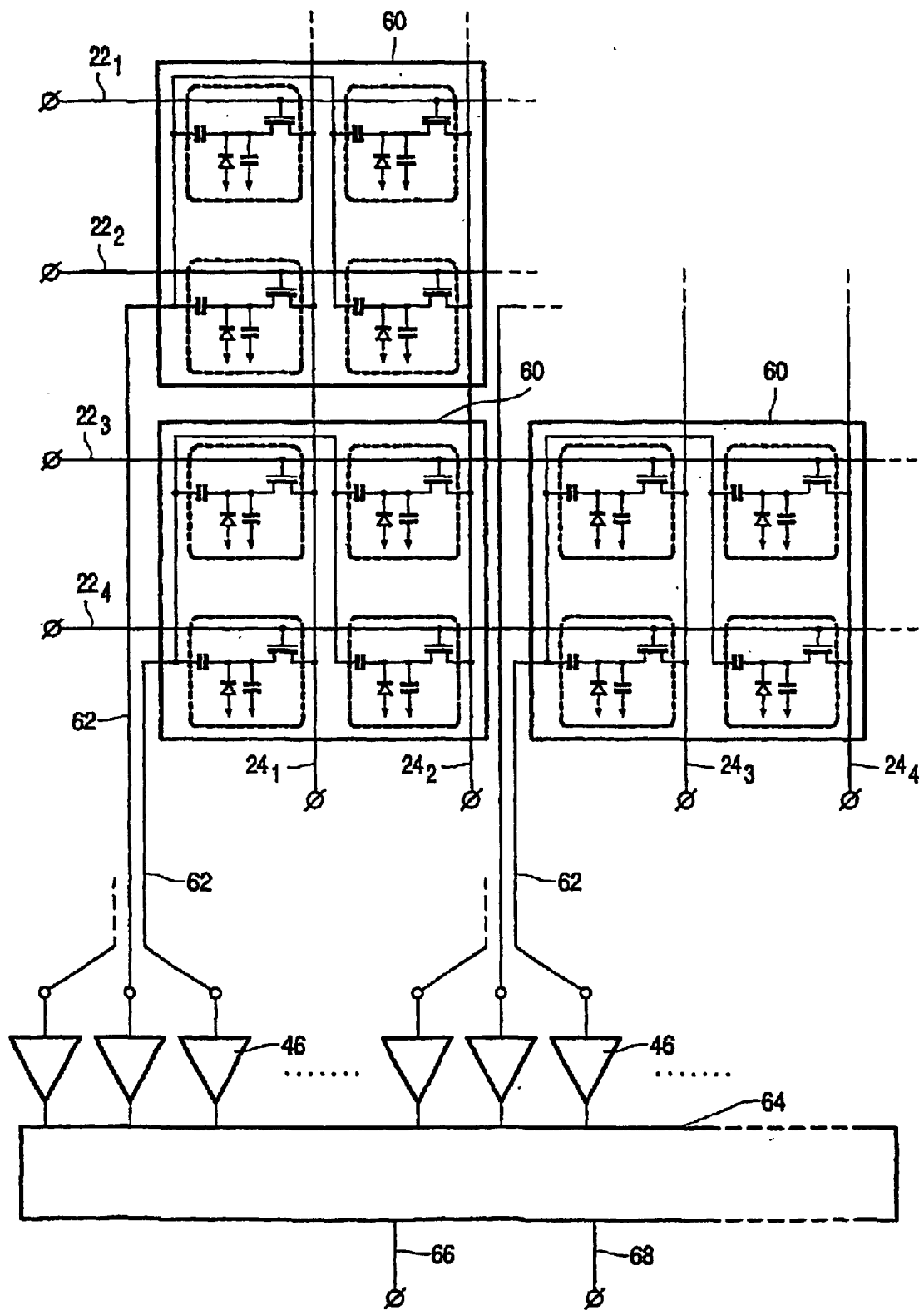
FIG. 5 shows a first grouping arrangement for dose sensing pixels of the invention.

As mentioned above, a number of dose sensing pixels are grouped together with their dose sensing signal outputs being provided to a common dose signal readout line. FIG. 5 shows one possible connection scheme for this purpose, and using the pixel configuration of FIG. 4.

FIG. 5 shows four rows of pixels, with row address lines $22_1$ to $22_4$, and four columns of pixels, with column readout lines $24_1$ to $24_4$. In the example of FIG. 5 groups 60 of four pixels are provided, each with a single dose signal readout line 62. The blocks 60 are arranged in rows and columns, and between the columns of blocks, a number of dose signal readout lines 62 are provided, corresponding in number to the number of blocks 60 in each column.

A processing unit 64 collects the dose signals from each dose signal readout line 62. It may be arranged to sum the dose signals of selected dose sensing pixel blocks 60, and provide these as a first dose output 66. Furthermore, a dose rate signal 68 may also be derived from the selected dose sensing pixel blocks 60, to indicate the dose per unit time.

As explained above, the exposure control is preferably carried out to provide the best image contrast for an area of the image of particular interest. Therefore, it is possible for the processing unit 64 to analyse a particular pattern of blocks 60 of interest for the particular x-ray examination taking place.

Furthermore, different weights can be assigned to certain dose sensing pixel blocks 60 to obtain a weighted dose signal and dose rate signal.

The configuration shown in FIG. 5 provides clusters of dose signal readout lines between columns of pixel blocks 60. This may provide visual artifacts in the final image, as it removes some of the pixel symmetry. A number of alternative connection schemes will now be described which enable the component and conductor layout for each pixel to be identical, thereby preventing the formation of these artifacts.

FIG. 6 again shows blocks 60 comprising four pixels which share a common dose signal readout line 62. In this example, the dose signal readout lines 62 are parallel to the column readout lines 24 and the column readout lines and dose signal readout lines are arranged in an alternate sequence. The dose signal readout lines 62 extend the full height of the sensor array so that each dose signal readout line 62 passes through all pixels in a column, even if those pixels are not providing signals to that particular line 62. For example, dose signal readout line $62_1$ is shown to pass the full height of the array, but connections 70 are provided only for the block of pixels $60_3$, and not for the block of pixels $60_1$. Likewise, dose signal readout lines $62_2$ passes through both blocks $60_1$ and $60_3$, although connections are only made to block $60_1$.

Figure 7:
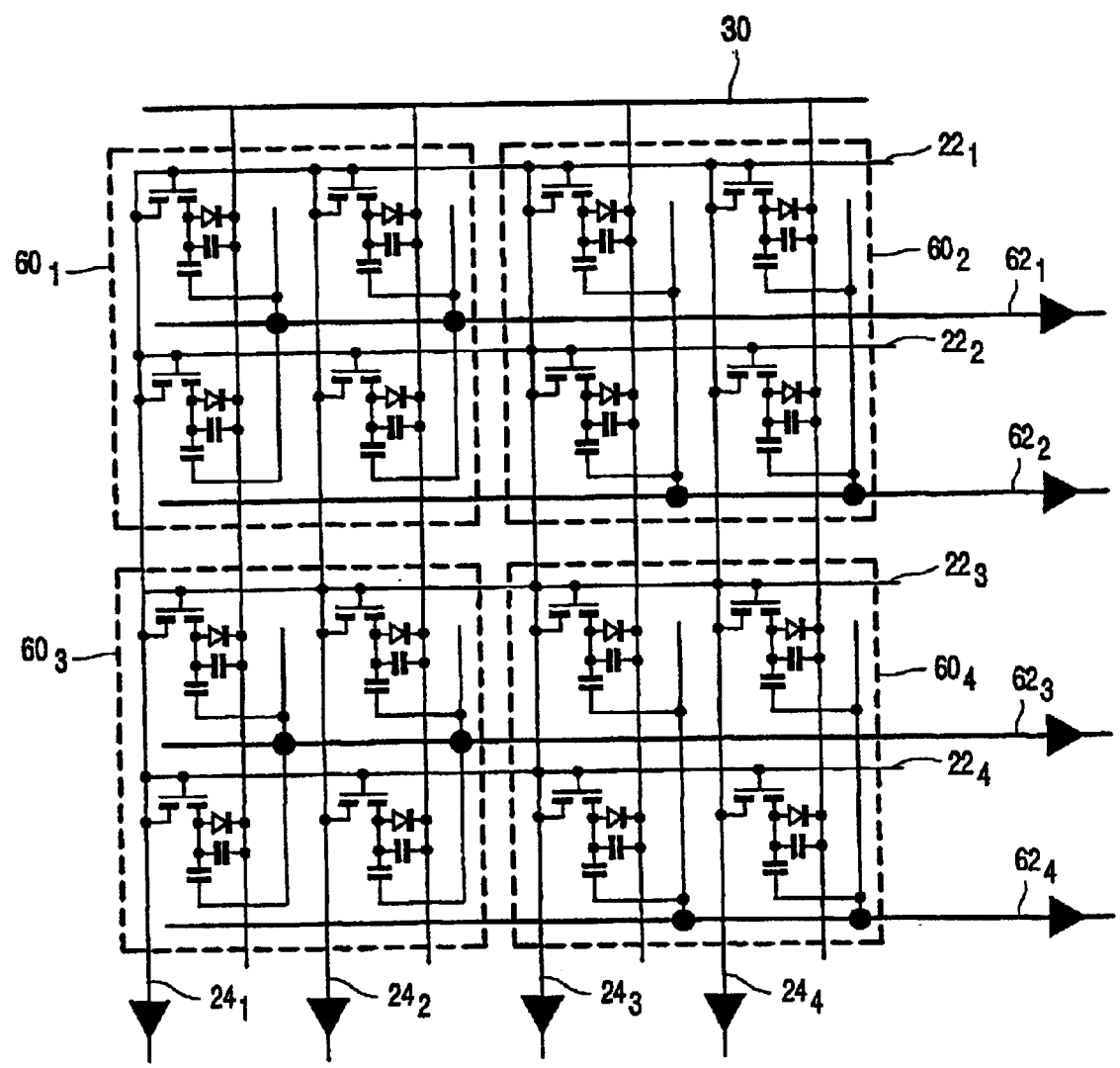
FIG. 7 shows a third grouping arrangement for dose sensing pixels of the invention.

FIG. 7 shows a similar construction but with dose signal readout lines $62_1$ to $62_4$ being arranged parallel with the row conductors $22_1$ to $22_4$, again with the dose signal readout lines 62 and the row conductors 22 defining an alternating sequence.

Figure 6:
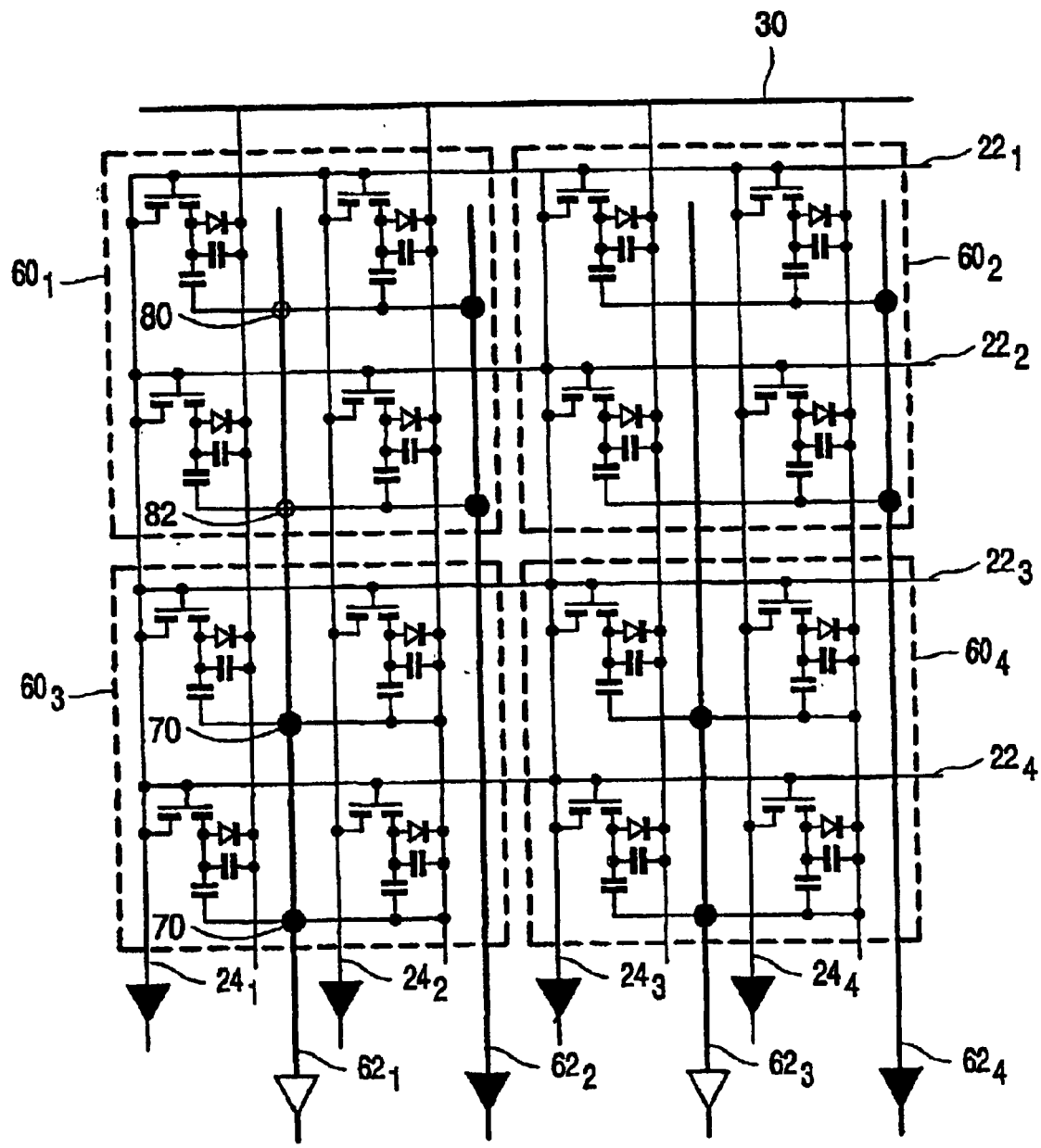
FIG. 6 shows a second grouping arrangement for dose sensing pixels of the invention.

One possible problem with the layouts of FIGS. 6 and 7 is that the number of crossing conductors may give rise to increased cross talk between dose sensing signals in different blocks 60. For example, in FIG. 6 the dose signal readout line $62_1$ crosses signal conductors carrying dose signals in the block $60_1$ in two places, labelled 80 and 82.

Figure 8:
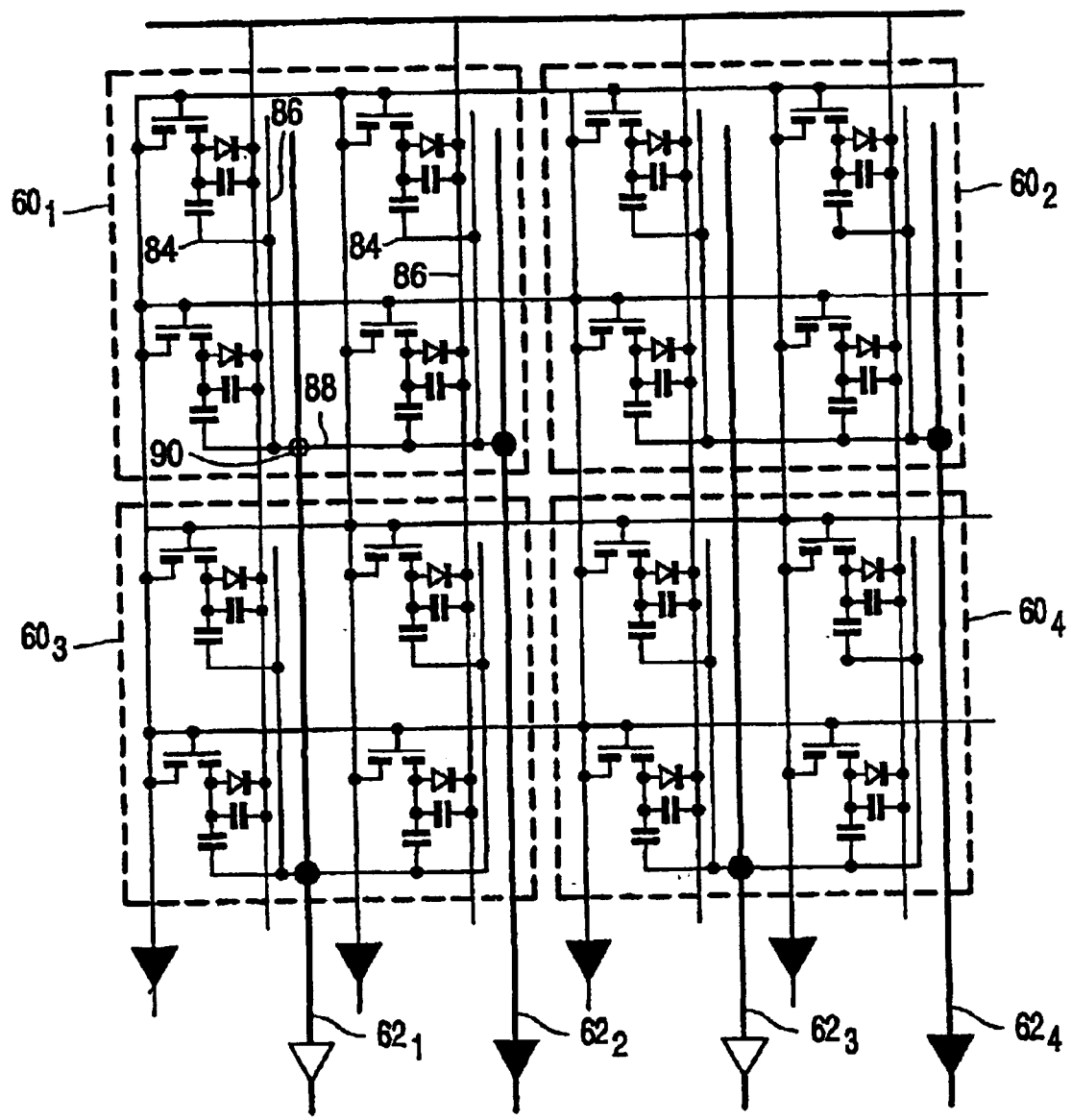
FIG. 8 shows a fourth grouping arrangement for dose sensing pixels of the invention.

FIG. 8 shows a modification to the layout of FIG. 6 to reduce the number of electrodes crossing the dose signal readout lines 62. In this case, pixel dose outputs 84 in each block 60 are connected together in columns with column lines 86, and a single row connection line 88 is provided for connecting together the pixel dose outputs 84 of different columns in the block. This single row connection line 88 provides a single crossover 90 within each block of pixels 60 with the dose signal readout lines 62 passing through the block.

Figure 9:
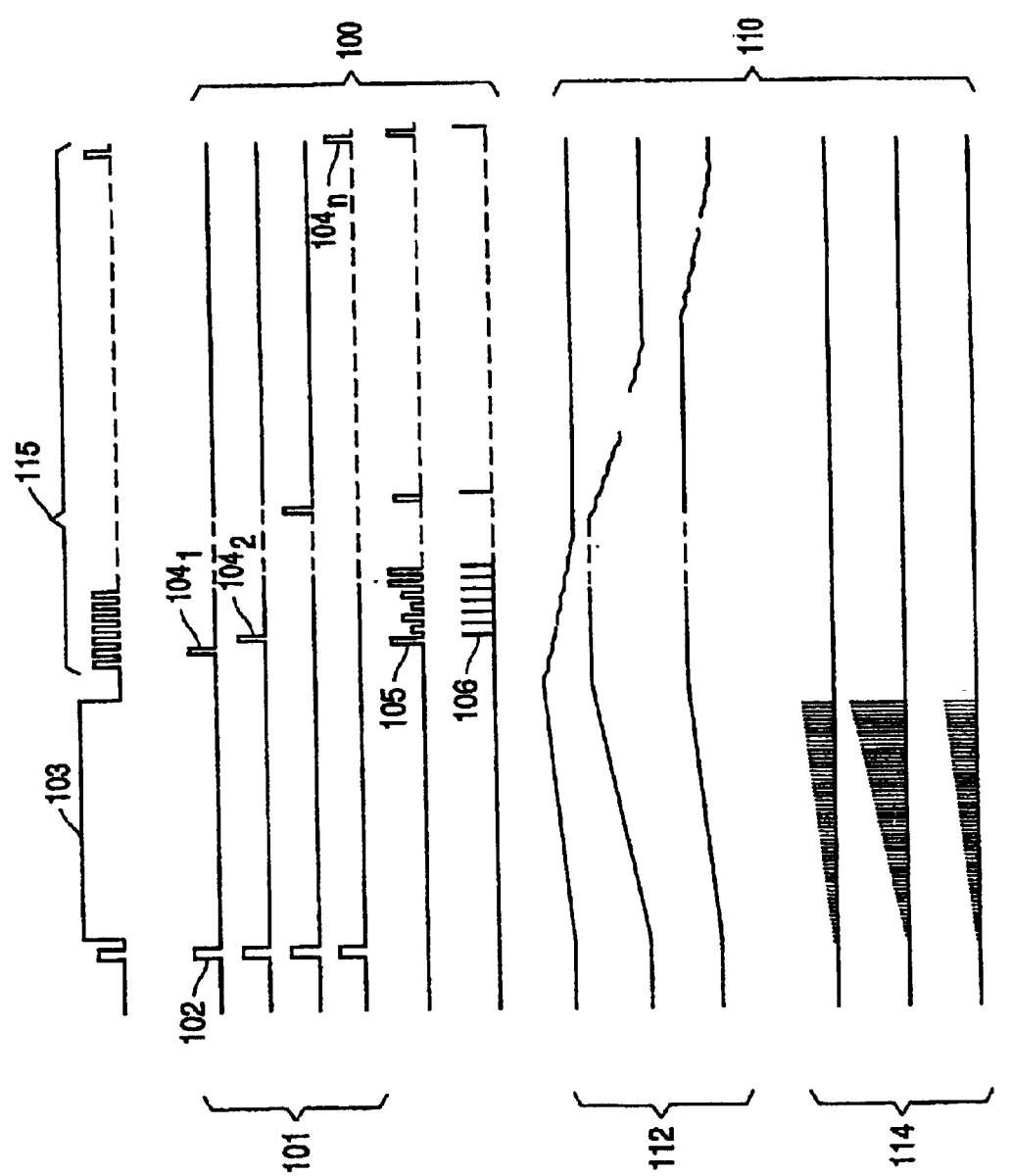
FIG. 9 is a timing diagram for explaining the image acquisition method of the invention.

FIG. 9 is a timing diagram used to explain the operation of the device during image acquisition. The plots 100 are used to explain the normal image read out operation, whereas plots 110 relate to the dose sensing function. The collection of plots 101 represent the row address signals applied successively to the rows of the array. Before X-ray exposure, each row is subjected to a reset pulse 102 which ensures that the pixel capacitor 28 is charged to the known level. No further row address signals are applied during X-ray exposure 103, following which the capacitors 28 of each row of pixels are recharged in turn, with a row address pulse 104 being applied to each row in sequence. During each row address pulse 104 charge sensitive amplifier outputs 105 for the full set of amplifiers are obtained, and before the next row address pulse 104, the charge sensitive amplifiers are reset using reset pulses 106.

During the X-ray exposure, the dose sensing current amplifiers 46 provide analogue signals 112 indicating the level of illumination to the respective block of dose sensing pixels. These analogue signals are sampled to provide signals 114 which can be analysed using digital techniques to obtain exposure information. When a given condition has been reached, analysis of the sampled outputs 114 results in termination of the X-ray exposure period 103 which is followed by the read out stage 115. The X-ray exposure may be pulsed, and the exposure control then dictates when the X-ray exposure ceases. The analogue signals 112 may instead be processed in the analogue domain without A/D conversion (sampling).

In the examples described above, the dose sensing pixels are described, in each case, as forming a block of 2×2 pixels. Of course, this is not necessarily the case, and in fact the dose sensing pixels will be grouped in much larger groups. To enable the implementations of FIGS. 6 to 8, there will only be as many dose sensing pixel blocks as there are rows or columns of the array. Taking an array with an equal number n of rows and columns, the smallest possible size of the pixel block is $\sqrt{n} \times \sqrt{n}$ pixels.

Of course, the array will not necessarily have the same number of rows and columns, and indeed the pixel blocks which share a common dose sensing signal output will not necessarily be square.

The manufacturing processes involved in forming the solid state device have not been described. The additional components provided by the invention can be integrated into existing pixel cells using the thin film techniques applied for those cells. Typically, such devices are amorphous or polycrystalline silicon devices fabricated using thin film techniques.

Although an additional dose sensing element is incorporated into the pixel design, a single photodiode is being used in each pixel to provide the image acquisition function as well as the dose sensing function. Similarly, the same scintillator (phosphor layer for X-ray-to-light conversion) is used for image acquisition and dose sensing. Thus, the spectral matching between image sensor and dose sensor is perfect, which cannot be achieved with external dose sensing devices. The slightly more complex pixel configuration will result in only a minor cost increase, as the same thin film deposition techniques will be employed as for the existing pixel configuration.

The additional connections between pixels required in the pixel blocks 60 are likely to require the solid state device to be manufactured in a multilevel configuration.

To illustrate the possible configurations, the capacitor implementation of FIG. 4 has been illustrated in each of FIGS. 5 to 8. The skilled addressee will understand, of course, that the configurations of FIGS. 5 to 8 may be applied equally to the individual transistor implementation represented in FIG. 3.

Various modifications will be apparent to those skilled in the art.

What is claimed is:

1. An X-ray detector apparatus comprising an array of detector pixels, each pixel comprising a conversion element for converting incident radiation into a charge flow, a charge storage element and a switching device enabling the charge stored to be provided to an output of the pixel, and wherein a plurality of dose sensing pixels further comprise a dose sensing element, wherein charge flow from the conversion element during X-ray exposure results in a change in the charge stored on the charge storage element and also results in a dose sensing signal being generated which can be read out from the pixel without resetting the charge of the charge storage element.

2. Apparatus as claimed in claim 1, further comprising a conversion layer for converting an incident X-ray signal into an optical signal, and wherein the conversion element comprises an optical sensor.

3. Apparatus as claimed in claim 2, wherein optical sensor comprises a photodiode.

4. Apparatus as claimed in claim 3, wherein the charge storage element comprises the self-capacitance of the photodiode.

5. Apparatus as claimed in claim 1, wherein the conversion element comprises a photoconductor.

6. Apparatus as claimed in claim 1, wherein the dose sensing signals for a plurality of dose sensing pixels are supplied to an individual dose signal readout line.

7. Apparatus as claimed in claim 6, wherein the pixels are arranged in rows and columns, with rows of pixels sharing a row address line and columns of pixels sharing a column readout line, and wherein the dose signal readout lines are parallel to the column readout lines and are arranged alternately with the column readout lines.

8. Apparatus as claimed in claim 7, wherein the dose sensing pixels associated with an individual dose signal readout line are arranged in a block, and wherein pixel dose outputs in the block are connected together in columns with column lines, and a single row connection line is provided for connecting together the pixel dose outputs of different columns in the block.

9. Apparatus as claimed in claim 6, wherein the pixels are arranged in rows and columns, with rows of pixels sharing a row address line and columns of pixels sharing a column readout line, and wherein the dose signal readout lines are parallel to the row address lines and are arranged alternately with the row address lines.

10. Apparatus as claimed in claim 1, wherein all pixels are dose sensing pixels.

11. An X-ray examination apparatus comprising:
- an X-ray source for exposing an object to be examined to X-ray energy; and
- an X-ray detector for receiving an X-ray image after attenuation by the object being examined, the X-ray detector comprising:
  - an array of detector pixels, each pixel comprising a conversion element for converting incident radiation into a charge flow, a charge storage element and a switching device enabling the charge stored to be provided to an output of the pixel, and wherein a plurality of dose sensing pixels further comprise a dose sensing element, wherein charge flow from the conversion element during X-ray exposure results in a change in the charge stored on the charge storage element and also results in a dose sensing signal being generated which can be read out from the pixel without resetting the charge of the charge storage element.

12. An apparatus as claimed in claim 1, wherein the pixels are arranged in rows and columns, with rows of pixels sharing a row address line and columns of pixels sharing a column readout line, wherein the charge storage element is connected in series with the switching device between a common electrode for all pixels and the column readout line, the switching device being controlled by the row address line.

13. Apparatus as claimed in claim 12, wherein a node is defined between the charge storage element and the switching device, and wherein the dose sensing element of the dose sensing pixels comprises a further charge storage element connected between the node and a dose signal readout line.

14. Apparatus as claimed in claim 12, wherein a node is defined between the charge storage element the switching device, and wherein the dose sensing element of the dose sensing pixels comprises a transistor connected between a dose electrode common for all the dose sensing pixels and a dose signal readout line, the gate of the transistor being connected to the node.

15. A method of X-ray examination using an apparatus comprising an X-ray source for exposing an object to be examined to X-ray energy and an X-ray detector for receiving an X-ray image after attenuation by the object to be examined, the X-ray detector comprising an array of detector pixels, each pixel comprising a conversion element for converting incident radiation into a charge flow, a charge storage element and a switching device enabling the charge stored to be provided to an output of the pixel, wherein a plurality of dose sensing pixels further comprise a dose sensing element, wherein charge flow from the conversion element during X-ray exposure results in a change in the charge stored on the charge storage element and also results in a dose sensing signal being generated which can be read out from the pixel without resetting the charge of the charge storage element, the method of controlling the X-ray examination apparatus comprising the steps of:
- exposing the object to be examined with X-ray radiation;
- monitoring output signals from selected dose sensing pixels during the exposure;
- halting the X-ray exposure in response to the dose sensing signal monitoring; and
- reading out the charges stored on the charge storage elements to obtain an X-ray image.

* * * * *